(12) United States Patent
Beier et al.

(10) Patent No.: US 11,566,674 B2
(45) Date of Patent: Jan. 31, 2023

(54) ELECTROMECHANICAL BRAKE ACTUATOR FOR DISC BRAKES

(71) Applicant: WABCO Europe BVBA, Brussels (BE)

(72) Inventors: Peter Beier, Wunstorf (DE); Paul Henning, Schwetzingen (DE); Bartlomiej Tomala, Opole (PL)

(73) Assignee: WABCO Europe BVBA, Brussels (BE)

(*) Notice: Subject to any disclaimer, the term of this patent is extended or adjusted under 35 U.S.C. 154(b) by 78 days.

(21) Appl. No.: 16/998,013

(22) Filed: Aug. 20, 2020

(65) Prior Publication Data

US 2021/0054894 A1 Feb. 25, 2021

(30) Foreign Application Priority Data

Aug. 22, 2019 (EP) .................................... 19193160

(51) Int. Cl.
| | | |
|---|---|---|
| B60T 13/74 | (2006.01) | |
| F16D 65/18 | (2006.01) | |
| F16D 55/224 | (2006.01) | |
| F16D 65/12 | (2006.01) | |
| F16D 65/02 | (2006.01) | |
| F16D 121/24 | (2012.01) | |
| F16D 125/28 | (2012.01) | |

(52) U.S. Cl.
CPC ............ *F16D 65/18* (2013.01); *F16D 55/224* (2013.01); *F16D 65/12* (2013.01); *F16D 2065/1344* (2013.01); *F16D 2121/24* (2013.01); *F16D 2125/28* (2013.01); *F16D 2200/003* (2013.01); *F16D 2200/0086* (2013.01)

(58) Field of Classification Search
CPC ............. F16D 2125/28; F16D 2125/30; F16D 2125/32; F16D 2125/36; F16D 2125/38; F16D 2125/40; F16D 2125/44; F16D 2125/50; F16D 2250/0007; B60T 13/741
See application file for complete search history.

(56) References Cited

U.S. PATENT DOCUMENTS 6,483,217 B1 * 11/2002 Roth-Stielow .......... F16D 55/28
188/161
2015/0075923 A1 * 3/2015 Jang .................... F16D 65/0006
188/162

(Continued)

FOREIGN PATENT DOCUMENTS

| WO | 2009016660 A1 | 2/2009 |
|---|---|---|
| WO | 2013121358 A1 | 8/2013 |

*Primary Examiner* — Nicholas J Lane
(74) *Attorney, Agent, or Firm* — Dickinson Wright PLLC (57) ABSTRACT

An electromechanical brake actuator (2) includes a housing (1), a first housing part (3) configured as a housing flange for attaching the electromechanical brake actuator (2) to a disc brake (38), a second housing part (4) for receiving a drive (6), a third housing part (5) arranged between the first housing part (3) and the second housing part (4) and connected to the first housing part (3) and the second housing part (4), a motor (37), a gearbox (7), and a tappet (9) or a spindle for actuating a disc brake (38). The housing (1) is an aluminum die-cast formed part. The first housing part (3) and the second housing part (4) have planar contact surfaces (34, 34a) configured to receive plates of a two-plate die-casting machine during the forming process of the housing (1).

13 Claims, 5 Drawing Sheets

(56) References Cited

U.S. PATENT DOCUMENTS

| | | | | |
|---|---|---|---|---|
| 2015/0308529 A1* | 10/2015 | Ambs | ................... | F16D 55/08 |
| | | | | 188/162 |
| 2016/0333951 A1* | 11/2016 | Lee | ...................... | F16D 55/227 |
| 2017/0023081 A1* | 1/2017 | Sala | ...................... | F16D 55/226 |
| 2020/0062230 A1* | 2/2020 | Henning | ............... | B60T 13/741 |
| 2020/0339093 A1* | 10/2020 | Takahashi | ............. | F16D 65/183 |
| 2021/0054888 A1* | 2/2021 | Henning | ............... | F16D 65/028 |
| 2021/0164529 A1* | 6/2021 | Henning | ................ | F16D 65/18 |

* cited by examiner

Fig. 6

ELECTROMECHANICAL BRAKE ACTUATOR FOR DISC BRAKES

TECHNICAL FIELD

The present disclosure relates to an electromechanical brake actuator with a housing for disc brakes of vehicles, in particular for disc brakes of commercial vehicles.

BACKGROUND

Housings are generally used to receive and protect components. In the vehicle sector, housings have to satisfy more stringent requirements, in other words high rigidity coupled with the lowest possible weight. Particularly in the region of the wheel suspension, housing parts are also greatly exposed to environmental conditions such as stone chips, dust, and snow. Furthermore, there is generally only a small amount of space available in the region of the wheel suspension for the installation of components. Current developments for the actuation of disc brakes extend to electromechanical brake actuators. Electromechanical brake actuators have a plurality of components that have to be protected from the environmental influences that have been described among other things. In addition, components such as a gearbox, a cam disc and a motor of the electromechanical brake actuator work together, which is why the components have to be fixedly arranged or mounted in the housing. In the course of lightweight design developments, an additional challenge for the electromechanical brake actuator is to be as light as possible in construction.

SUMMARY

The problem addressed by the invention is that of providing an electromechanical brake actuator with a housing, wherein the housing has a low weight and a high rigidity and is easy to produce.

The problem is solved in that the housing of the electromechanical brake actuator is an aluminum die-cast formed part. Aluminum has a lower density compared with steel, which is why the aluminum die-cast formed part is lighter than a steel housing. When fitted in a vehicle, the weight difference of the aluminum die-cast formed part compared with a steel housing allows additional fuel savings to be made when running a vehicle. Moreover, as a material aluminum has good forming properties which is why the elaboration of detailed characteristics such as reinforcement ribs or drilled holes is also possible without major reworking. In addition, aluminum as a material allows the aluminum die-cast formed part to be produced in one piece. Further connection elements, such as screws, are not required for production of the aluminum die-cast formed part.

In a preferred development, the first housing part of the aluminum die-cast formed part has a contact surface for a first plate of the two-plate die-casting machine and the second housing part of the aluminum die-cast formed part has a second contact surface for a second plate of a two-plate die-casting machine.

The use of a two-plate die-casting machine is substantially more cost-effective in comparison with a four-plate die-casting machine and only two planar surfaces are required on the housing on which the plates of the die-casting machine are located and generate the necessary pressure for the reforming of the main body into a housing.

The first contact surface for the first plate is the flange facing for attachment to a disc brake. The second contact surface for the second plate is the flange facing of an assembly opening for the attachment of a cover. All other surfaces of the housing may therefore exhibit attachment surfaces formed in a non-planar manner or be configured by means of additional reinforcement ribs. Moreover, the aluminum die-cast formed part may be smaller in terms of its dimensions, since planar surfaces which already exist are used as contact surfaces for the plates of the two-plate die-casting machine and no planar surface has to be created on the aluminum die-cast formed part by means of additional material.

In a further embodiment, the second housing part has a motor flange for attachment of a motor axially in relation to an axial axis of the second housing part. The motor flange has a circular design and corresponds to the shape of an electric motor. On the outer wall of the second housing part there are four bores, in particular four threaded bores, for attachment of a motor. The bores allow simple assembly and dismantling of the motor. In a second embodiment, however, the second housing part may also have a cylindrical subregion for receiving the motor and a motor flange for attachment of the motor to a bearing point of the second housing part axially relative to an axial axis of the second housing part. In the second embodiment of the second housing part, the bores are configured to receive and attach a cover. The second housing part and the cover completely enclose the motor in the second embodiment.

In addition, in a further embodiment the motor flange has a central bearing point starting from the axial axis of the second housing part. Starting from the bearing point, reinforcement ribs are arranged radially toward the outer wall. Particularly preferably, reinforcement ribs are arranged radially between the bearing point and the outer wall, wherein the reinforcement ribs are arranged at an equal distance from one another and therefore ensure uniform rigidity between the bearing point and the outer wall.

Moreover, in a further embodiment the second housing part has on the inner side bearing receptacles for the arrangement of bearings axially between the motor flange and the gearbox, wherein the bearings are configured to receive the cam disc. Specifically, two bearing receptacles are formed on the inner side of the housing. One bearing receptacles is arranged on the gearbox side, in other words on the inner side of the second housing part on which the gearbox of the electromechanical brake actuator is flange-mounted. The second bearing receptacles is arranged on the motor flange side, in other words on the inner side of the second housing part on which the motor of the electromechanical brake actuator is flange-mounted. The bearing receptacles are preferably configured for needle bearings.

In a further advantageous embodiment, the second housing part has an assembly opening for the cam disc radially opposite the direction of the first housing part between the motor flange and the gearbox. The assembly opening is advantageously circular in design and corresponds to the shape of an elongate groove, so that the assembly opening changes tangentially into a straight line. It is also conceivable for the circular assembly opening to be continued tangentially in a circular manner, wherein the assembly opening width is sufficient to introduce the cam disc in its narrowest extent into the assembly opening. The assembly opening largely corresponds to the dimension of the cam disc, meaning that the cam disc can be fitted into the second housing part of the electromechanical brake actuator or removed from it for maintenance purposes.

In addition, in a further embodiment the assembly opening has recesses for receiving a machining tool and bores for receiving a cover. The cover completely covers the assembly opening and protects the electromechanical brake actuator from the penetration of unwanted environmental influences such as dust or gravel. The recesses and bores are introduced radially on an outer edge of the assembly opening. The assembly opening preferably has two opposite and obliquely offset recesses, wherein the recesses are configured as blind holes. In addition, four bores for receiving a cover which overlaps the assembly opening are preferably introduced in the outer edge of the assembly opening. The bores are arranged in a uniformly offset manner for the form-fitted and force-fitted fixing of the cover.

In a further embodiment, the third housing part is cylindrical in design and has a guide channel for guiding a tappet or a spindle axially along an axial axis of the third housing. The cylindrical embodiment of the third housing part is adapted to the shape of the tappet. This means that the first housing part, the second housing part, and the third housing part have different forms required for the intended use. Compared with a uniformly sized housing, the three housing parts taken together are lighter and more compact and require less material for production of the housing than a uniformly sized housing of an electromechanical brake actuator. Moreover, the guide channel in the third housing part is configured in terms of its dimensions in such a manner that the tappet is mounted and guided in a sliding manner in the guide channel.

According to a further embodiment, the first housing part has an opening for receiving and actuating the tappet which is central in relation to an axial axis of the first housing part. The tappet of the electromechanical brake actuator can tension the disc brake by means of a rotary lever of the disc brake via the opening.

In a further embodiment, an inner diameter of the opening advantageously corresponds to an inner diameter of the guide channel.

The opening should therefore be regarded as part of the guide channel. An opening which is configured smaller than the tappet would cause the tappet to jam during actuation of the electromechanical brake actuator. An excessively large opening, in other words an opening which is larger in diameter than the guide channel, leads to the tappet not being correctly guided axially toward the rotary lever of the disc brake and this can lead to jamming or even to the tappet falling out of the guide channel.

In a further embodiment, the first housing part has bores for attachment to a disc brake axially on the first outer peripheral region of the first housing part. The first housing part corresponds in terms of size and shape to an opening for the actuation of the disc brake. The electromechanical brake actuator is fixed to the disc brake in a form-fitted and force-fitted manner, preferably by means of four bores in the first housing part, into which screws or rivets are introduced. In addition, the first housing part has struts radially between the bores which are configured as reinforcement ribs.

In a final embodiment, the first housing part has a groove for receiving a seal axially, opposing the direction of the third housing part. Specifically, the groove is introduced in the first housing part on the flange side for attachment to the disc brake. A seal which seals the connection between the disc brake and the housing to the first housing part against environmental influences is embedded in the groove. The groove is introduced free from interruptions along the flange side of the first housing part. The bores of the first housing part are located outside the surface to be sealed of the flange side of the first housing part.

Selected exemplary embodiments of the invention are explained below with the help of the attached drawings.

DETAILED DESCRIPTION OF THE DRAWINGS

Figure 1:
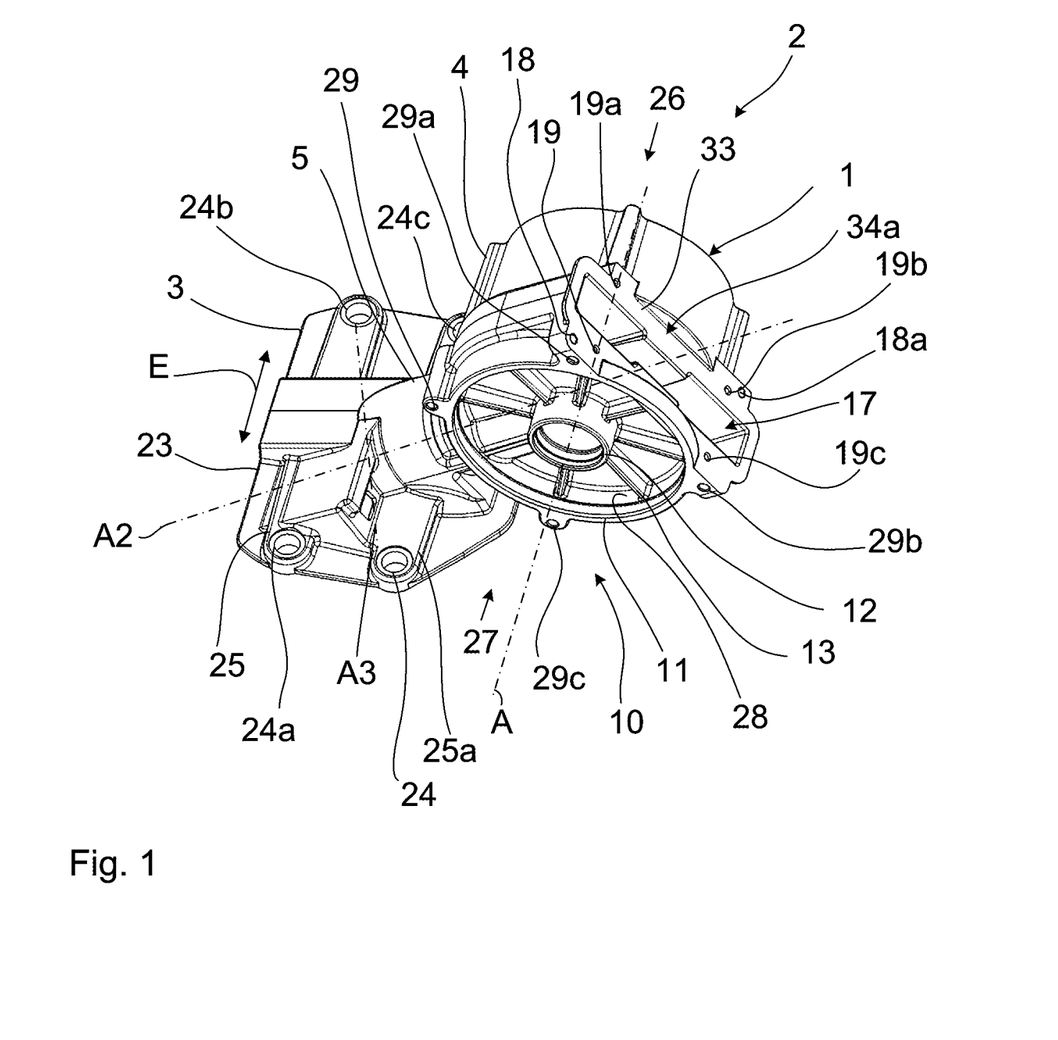
FIG. 1 shows an electromechanical brake actuator from a laterally rotated view without motor and cam disc.
Figure 2:
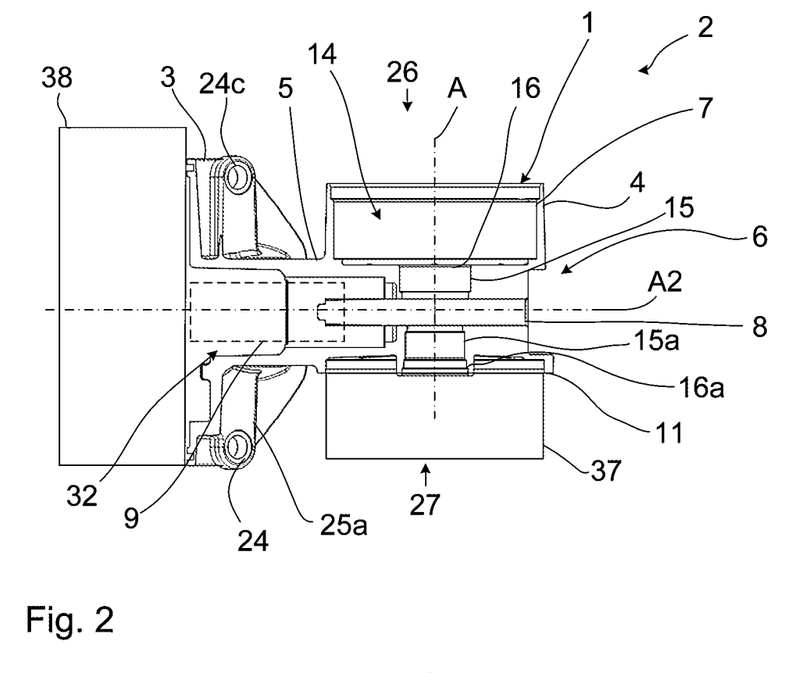
FIG. 2 shows a sectional view of an electromechanical brake actuator.
Figure 4:
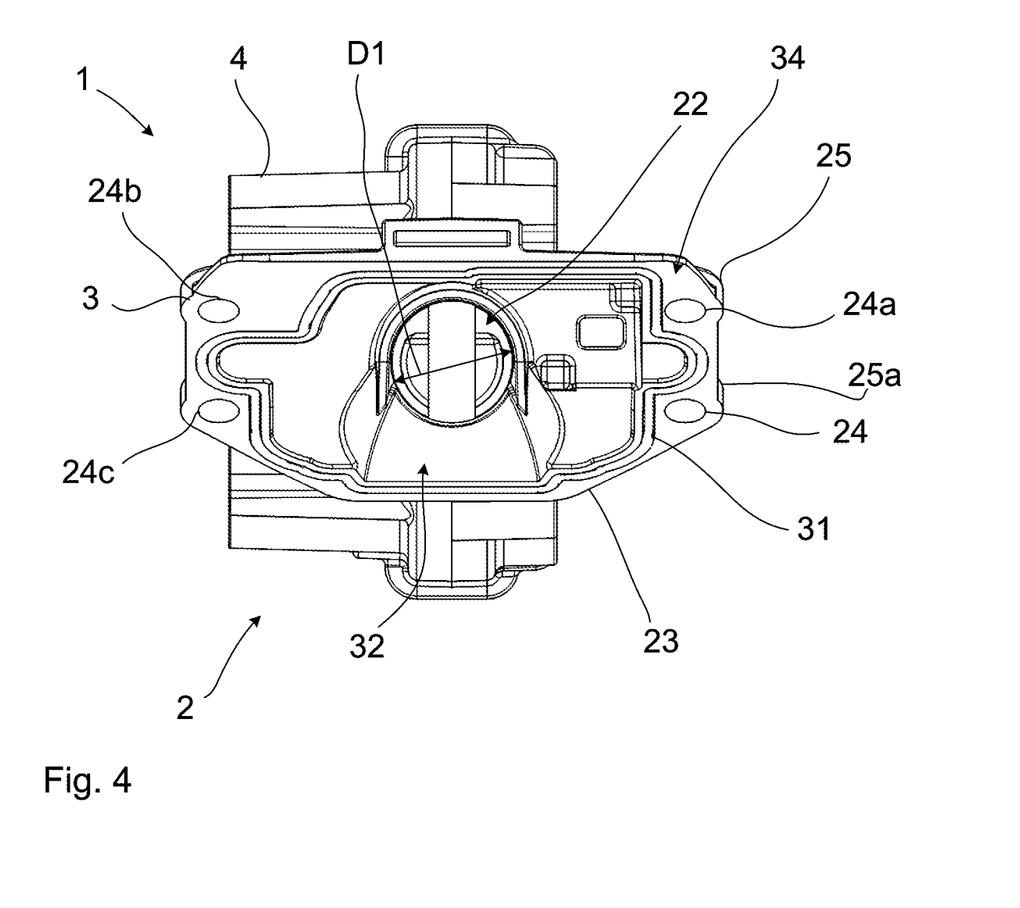
FIG. 4 shows a front view of an electromechanical brake actuator starting from a first housing part.

FIG. 1 shows an electromechanical brake actuator 2 having a motor 37 shown in FIG. 2 and a cam disc 8 (see FIG. 2). The electromechanical brake actuator 2 is shown from an outer side 10 of a housing 1. The housing 1 is made up of three housing parts. A first housing part 3 has a plate-shaped design as a flange for attachment to a cam disc 38 shown in FIG. 2. Starting from an axial axis A3 of the first housing part 3, the first housing part 3 has four axial bores 24, 24a, 24b, 24c. The bores 24, 24a, 24b, 24c are arranged on an outer peripheral region 23 of the first housing part 3 and are used for fixing to a disc brake 38 shown in FIG. 2 by means of screws which are not shown. Between the opposite bores 24, 24c and the opposite bores 24a, 24b are arranged reinforcement ribs 25, 25a. A third housing part 5 is arranged centrally on the first housing part 3. The third housing part 5 is formed as a cylinder and connects the first housing part 3 to a second housing part 4. Starting from a reference plane E of the first housing part 3, the third housing part 5 projects along an axial axis A2 of the third housing part 5 obliquely from the reference plane E. Starting from an axial axis A of the second housing part 4, the second housing part 4 has a cylindrical design, wherein the second housing part 4 has a drive-side region 26 and a motor flange-side region 27. The motor flange-side region 27 of the second housing part 4 has a motor flange 11 for the attachment of a motor 37 (see FIG. 2). The torque of the motor 37 is supported as the reaction moment via the motor flange 11. A bearing point 12 for supporting the resulting axial forces and/or actuation forces of a tappet 9 is arranged centrally and axially in the motor flange 11 on a cam disc 8 arranged in the second brake housing part 4 (see FIG. 2). Reinforcement ribs 13 are arranged starting from the bearing point 12 and running radially toward a circumferential peripheral region 28 of the motor flange 11. In order to attach the motor 37 to the motor flange 11, the circumferential peripheral region 28 of the motor flange 11 has four bores 29, 29a, 29b, 29c. An assembly opening 17 is arranged between the motor flange 11 and the drive-side region 26 of the electromechanical brake actuator 2 of the second housing part 4. The assembly opening 17 has a flange region 33 for the arrangement of a cover which is not shown. In addition, the flange region 33 has a second planar contact surface 34 on which a plate of a two-plate die-casting machine is supported during the forming process of the housing 1. A first planar contact surface 34 is shown in FIG. 4. The plate and the two-plate die-casting machine are not shown. Via bores 19, 19*a*, 19*b*, 19*c* in the assembly opening 17, the cover which is not shown is connected in a force-fitted and form-fitted manner by means of screws. Two recesses 18, 18*a* which lie obliquely opposite one another on the flange region 33 of the assembly opening 17 simplify machining of the housing 1 during production.

FIG. 2 shows a partial view of the electromechanical brake actuator 2 shown in FIG. 1. In addition, FIG. 2 shows an inner side 14 of the housing 1 with a drive 6. A gearbox 7 for adjusting the speeds of the motor 37 to the cam disc 8 can clearly be seen in the second housing part 4 in the drive-side region 26. Two bearing receptacles 15, 15*a* of the second housing part 4 have two bearings 16, 16*a* configured as needle bearings. The needle bearings 16, 16*a* support the cam disc 8. It can be seen particularly clearly that the second housing part 4 is adapted according to the internal components, such as the cam disc 8 or the gearbox 7, so that the housing 1, the constituent part of which is the second housing part 4, is as small as possible in structure. Moreover, it can be inferred from FIG. 2 that the first housing part 3, the second housing part 4, and the third housing part 5 is configured without further fixing elements as a housing 1. Furthermore, the first housing part 3 has a recess 32. The recess 32 is configured to partially receive a rotary lever of the disc brake 38 which is not shown (see FIG. 2), wherein the rotary lever which is not shown is connected to the tappet 9 in order to actuate the disc brake 38 (see FIG. 2).

Figure 3:
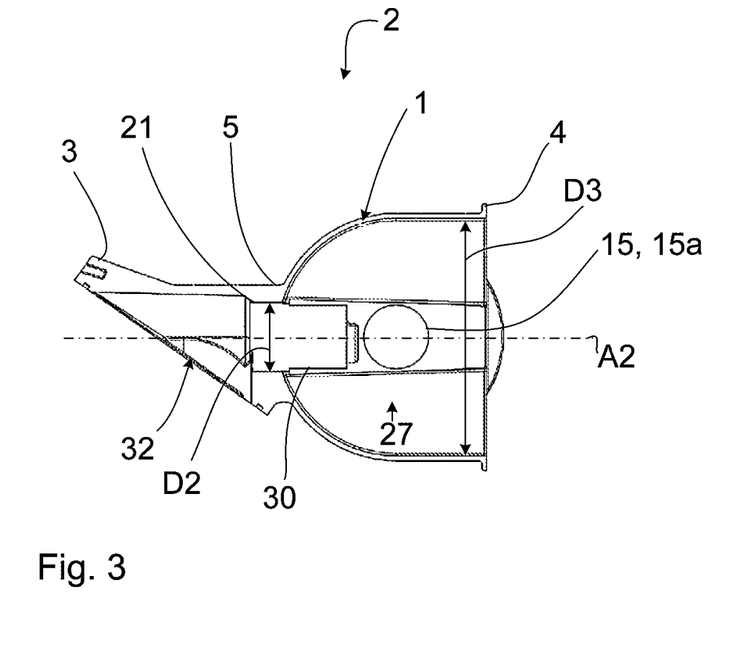
FIG. 3 shows a laterally sectional view of an electromechanical brake actuator.

FIG. 3 shows the electromechanical brake actuator 2 without cam disc 8 (see FIG. 2) and the bearings 16, 16*a* provided to support the cam disc 8 (see FIG. 2). In other words, the bearing receptacles 15, 15*a* arranged centrally in the second housing part 4 can clearly be seen. A greatest radial diameter D3 of the second housing part 4 is 72.5 mm. A tappet receptacles 30 for positioning the tappet 9 is formed in the third housing part 5, wherein the tappet receptacles 30, starting from the axial axis A2 of the third housing part 5, merges from the third housing part 5 into the second housing part 4. The tappet receptacles 30 merges in the third housing part 5 into a guide channel 21 for guiding and positioning the tappet 9. The guide channel 21 has an inner diameter D2 of 42 mm.

FIG. 4 once again shows the electromechanical brake actuator 2 according to FIGS. 1 to 3 as a front view starting from the first housing part 3. The first housing part 3 is shown from the flange side for attachment of the disc brake 38 (see FIG. 2). The first planar contact surface 34 is used during the forming process of the housing 1 to support a plate of a two-plate die-casting machine. Also identifiable is an opening 22 of the first housing part 3 for receiving and actuating the tappet 9. An inner diameter D1 of the opening 22 corresponds to the inner diameter D2 of the guide channel 21 for the tappet 9. In order to seal the opening 22 to prevent penetration of dirt, the first housing part 3 has a circumferential groove 31 on the flange side to receive a seal which is not shown. The groove 31 is sectionally introduced on the outer peripheral region 23 of the first housing part 3, but it excludes the bores 24, 24*a*, 24*b*, 24*c* for fixing the electromechanical brake actuator 2 to the disc brake 38 (see FIG. 2). Furthermore, FIG. 4 shows that the recess 32 for the partial receiving of a rotary lever which is not shown runs from the opening 22 in a funnel-shaped manner radially toward the outer peripheral region 23 of the first housing part 3.

Figure 5:
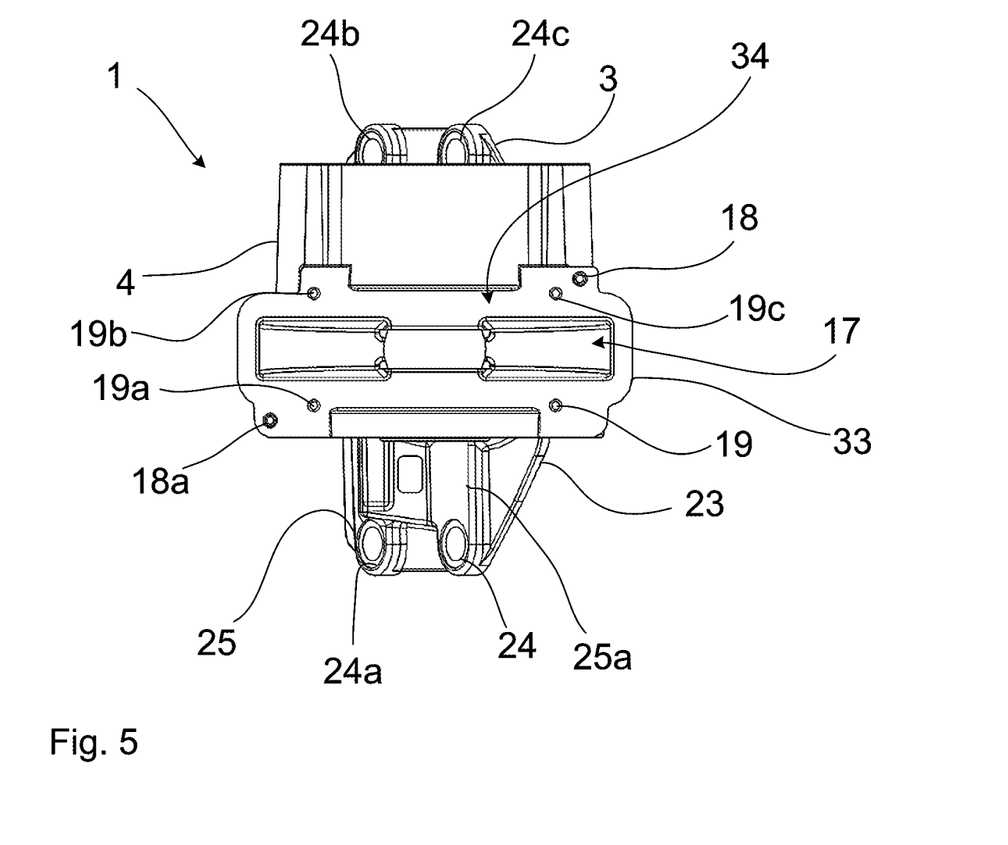
FIG. 5 shows a plan view of an electromechanical brake actuator starting from the second housing part.

FIG. 5 once again shows in detail the assembly opening 17 of the second housing part 4 of the electromechanical brake actuator 2 shown in FIGS. 1 to 4.

Figure 6:
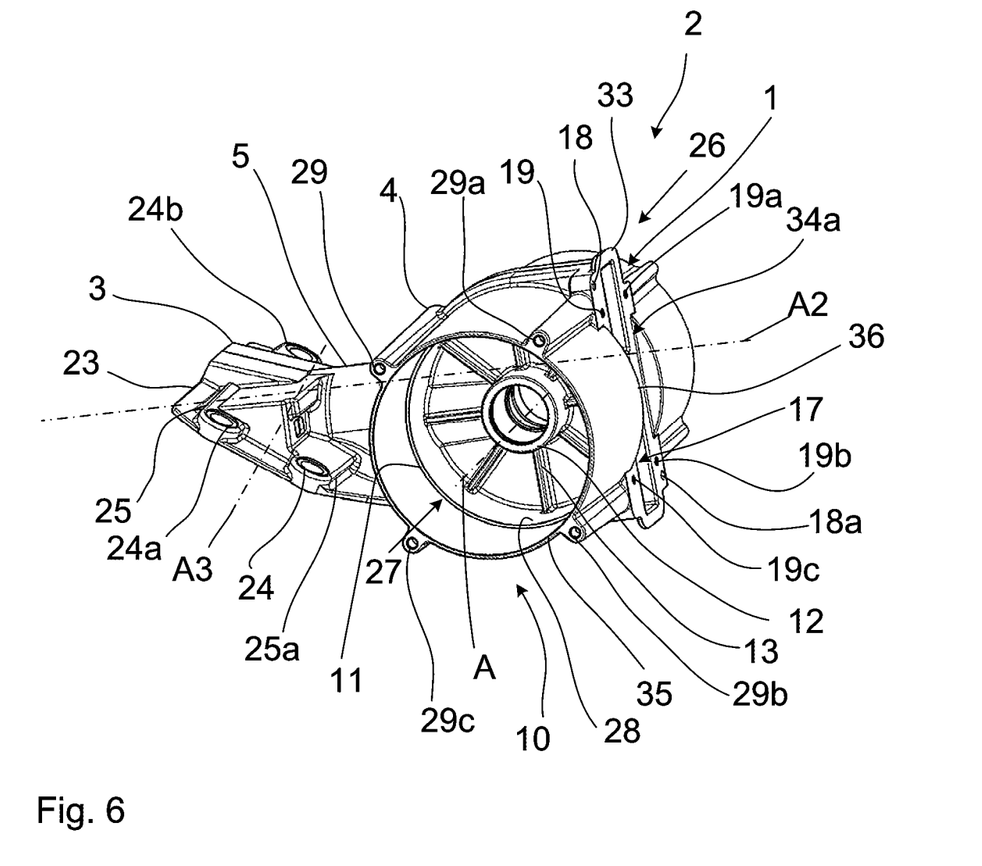
FIG. 6 shows an electromechanical brake actuator in an alternative embodiment from a laterally rotated view without motor and cam disc.

FIG. 6 shows an alternative embodiment of the electromechanical brake actuator 2. Except for the attachment of the motor 37 (see FIG. 2), the alternative embodiment is identical in terms of components to the electromechanical brake actuator 2 according to FIGS. 1 to 5. The motor 37 is arranged on the motor flange-side region 27 of the electromechanical brake actuator 2 along the axial axis A of the second housing part 4 directly in the second housing part 4. A cylindrical partial region 36 of the second housing part 4 is extended axially to receive the motor 37 in the motor flange-side region 27 of the electromechanical brake actuator 2. The bores 29, 29*a*, 29*b*, 29*c* of the second housing part 4 are used for receiving and fixing a cover which is not shown for closing the second housing part 4.

While the above description constitutes the preferred embodiments of the present invention, the invention is susceptible to modification, variation and change without departing from the proper scope and fair meaning of the accompanying claims.

LIST OF REFERENCE NUMBERS AS PART OF THE DESCRIPTION 1 housing
2 electromechanical brake actuator
3 first housing part
4 second housing part
5 third housing part
6 drive
7 gearbox of the drive 6
8 cam disc of the drive 6
9 tappet
10 outer side of the housing 1
11 motor flange
12 bearing point
13 reinforcement ribs
14 inner side of the housing 1
15, 15a bearing receptacles
16, 16a bearing
17 assembly opening
18, 18a recesses in the assembly opening 17
19 to 19c bores in the assembly opening 17
21 guide channel
22 opening of the first housing part 3
23 outer peripheral region of the first housing part 3
24 to 24c bores of the first housing part 3
25, 25a reinforcement ribs
26 drive-side region of the second housing part 4
27 motor flange-side region
28 circumferential peripheral region of the motor flange 11
29 to 29c bores in the second housing part 4
30 tappet receptacles
31 groove in the first housing part 3
32 recess
33 flange region of the assembly opening 17
34 first planar contact surface
34a second planar contact surface
36 cylindrical partial region of the second housing part 4
37 motor
38 disc brake
A axial axis of the second housing part 4
A2 axial axis of the third housing part 5
A3 axial axis of the first housing part 3

D1 inner diameter of the opening 22 in the first housing part 3
D2 inner diameter of the guide channel 21
D3 largest radial diameter of the second housing part 4
E reference plane

The invention claimed is:

1. An electromechanical brake actuator (2) comprising:
a housing (1) having:
a first housing part (3) configured as a housing flange for attaching the electromechanical brake actuator (2) to a disc brake (38);
a second housing part (4) for receiving a drive (6); and
a third housing part (5) arranged between the first housing part (3) and the second housing part (4) and connected to the first housing part (3) and the second housing part (4);
a motor (37);
a gearbox (7); and
a tappet (9) or a spindle for actuating the disc brake (38);
wherein the housing (1) is an aluminum die-cast formed part;
wherein the second housing part (4) has a motor flange (11) for attaching the motor (37) on an outer side (10) of the housing (1) or wherein the second housing part (4) has a cylindrical partial region (36) for receiving a motor (37) and a motor flange (11) for attaching a motor (37); and
wherein on an inner side (14) of the housing (1), the second housing part (4) has bearing receptacles (15, 15a) for bearings (16, 16a) disposed axially between the motor flange (11) and the gearbox (7), wherein the bearings (16, 16a) are configured to receive a cam disc (8).

2. The electromechanical brake actuator (2) as claimed in claim 1, wherein the second housing part (4) has an assembly opening (17) for the cam disc (8) radially opposite from the first housing part (3) between the motor flange (11) and the gearbox (7).

3. The electromechanical brake actuator (2) as claimed in claim 2, wherein the assembly opening (17) has recesses (18, 18a) for receiving a machining tool and wherein the assembly opening (17) has bores (19, 19a, 19b, 19c) for receiving a cover.

4. The electromechanical brake actuator (2) as claimed claim 1, wherein the third housing part (5) defines an internal channel that guides the tappet (9) or spindle axially along the longitudinal axis (A2).

5. The electromechanical brake actuator (2) as claimed in claim 1, wherein the motor flange (11) has a central bearing point (12) starting from an axial axis (A) of the second housing part (4), and the motor flange (11) has reinforcement ribs (13) extending radially toward the outer side (10) of the housing (1) starting from the bearing point (12).

6. An electromechanical brake actuator (2) comprising:
a housing (1) having:
a first housing part (3) configured as a housing flange for attaching the electromechanical brake actuator (2) to a disc brake (38);
a second housing part (4) for receiving a drive (6); and
a third housing part (5) arranged between the first housing part (3) and the second housing part (4) and connected to the first housing part (3) and the second housing part (4);
a motor (37);
a gearbox (7); and
a tappet (9) or a spindle for actuating the disc brake (38);
wherein the housing (1) is an aluminum die-cast formed part;
wherein the third housing part (5) is cylindrical and has a guide channel (21) for guiding the tappet (9) axially along an axial axis (A2) of the third housing part (5).

7. The electromechanical brake actuator (2) as claimed in claim 6, wherein the first housing part (3) has a first planar contact surface (34) and the second housing part (4) has a second planar contact surface (34a), wherein the first and second planar contact surfaces (34, 34a) are configured to receive plates of a two-plate die-casting machine during the forming process of the housing (1).

8. The electromechanical brake actuator (2) as claimed in claim 6, wherein the second housing part (4) has a motor flange (11) for attaching the motor (37) on an outer side (10) of the housing (1) or wherein the second housing part (4) has a cylindrical partial region (36) for receiving a motor (37) and a motor flange (11) for attaching the motor (37).

9. The electromechanical brake actuator (2) as claimed in claim 8, wherein the motor flange (11) has a central bearing point (12) starting from an axial axis (A) of the second housing part (4), and the motor flange (11) has reinforcement ribs (13) extending radially toward the outer side (10) of the housing (1) starting from the bearing point (12).

10. The electromechanical brake actuator (2) as claimed in claim 6, wherein the first housing part (3) has an opening (22) for receiving and actuating the tappet (9), the opening being central with respect to an axial axis (A3) of the first housing part (3).

11. The electromechanical brake actuator (2) as claimed in claim 10, wherein an inner diameter (D1) of the opening (22) corresponds to an inner diameter (D2) of the guide channel (21).

12. The electromechanical brake actuator (2) as claimed in claim 6, wherein the first housing part (3) has bores (24, 24a, 24b, 24c) for attachment to the disc brake (38) axially on an outer peripheral region (23) of the first housing part (3).

13. The electromechanical brake actuator (2) as claimed claim 6, wherein the first housing part (3) has a groove (31) for axially receiving a seal on a side facing the third housing part (5).

* * * * *